United States Patent
McGuire et al.

(10) Patent No.: US 9,562,762 B2
(45) Date of Patent: Feb. 7, 2017

(54) AUTOMATED OPTICAL DIMENSIONING AND IMAGING

(71) Applicant: Amazon Technologies, Inc., Reno, NV (US)

(72) Inventors: Jonathan G. McGuire, Seattle, WA (US); Sarah D. Benjamin, Seattle, WA (US); Sunil Ramesh, San Jose, CA (US); Peter D. Rowley, Sammamish, WA (US); Matthew Warren Amacker, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 13/654,879

(22) Filed: Oct. 18, 2012

(65) Prior Publication Data

US 2014/0111615 A1   Apr. 24, 2014

(51) Int. Cl.
*H04N 13/02* (2006.01)
*G01B 11/24* (2006.01)
*G03B 15/06* (2006.01)
*G03B 17/56* (2006.01)
*G06Q 30/06* (2012.01)

(52) U.S. Cl.
CPC .............. *G01B 11/24* (2013.01); *G03B 15/06* (2013.01); *G03B 17/561* (2013.01); *G06Q 30/0601* (2013.01); *G06Q 30/0643* (2013.01)

(58) Field of Classification Search
CPC ... G01B 1/241; H04N 13/0221; G01M 3/3209
USPC ................................................ 348/46; 73/52
See application file for complete search history.

(56) References Cited

U.S. PATENT DOCUMENTS

| | | | | |
|---|---|---|---|---|
| 4,699,484 | A * | 10/1987 | Howell et al. | 352/243 |
| 5,184,191 | A * | 2/1993 | Krishnan | G01N 21/01 356/244 |
| 6,677,944 | B1 * | 1/2004 | Yamamoto | G06T 17/00 345/422 |
| 6,834,960 | B2 * | 12/2004 | Dbjay | 352/243 |
| 8,203,702 | B1 | 6/2012 | Kane et al. | |
| 8,219,438 | B1 | 7/2012 | Moon et al. | |
| 8,812,355 | B2 * | 8/2014 | Angell et al. | 705/14.26 |

(Continued)

FOREIGN PATENT DOCUMENTS

| | | |
|---|---|---|
| JP | 11-194409 | 7/1999 |
| JP | 2001-004929 | 1/2001 |

(Continued)

OTHER PUBLICATIONS

International Search Report, dated Apr. 29, 2014.

(Continued)

*Primary Examiner* — Tat Chio
*Assistant Examiner* — Masum Billah
(74) *Attorney, Agent, or Firm* — Thomas | Horstemeyer, LLP

(57) ABSTRACT

Disclosed are various embodiments for automatically generating media and/or data associated with an item. An item imaging apparatus may apply an imaging sequence based on an item being imaged to gather media and/or data associated with the item. The media and/or data associated with the item may be used in the generation of additional data associated with the item. The media and/or data may be in a profile of the item in an electronic marketplace.

26 Claims, 11 Drawing Sheets

(56) References Cited

U.S. PATENT DOCUMENTS

| | | | |
|---|---|---|---|
| 2001/0034658 A1 | 10/2001 | Silva et al. | |
| 2003/0071194 A1* | 4/2003 | Mueller | G01B 11/00 |
| | | | 250/208.1 |
| 2004/0036841 A1* | 2/2004 | Dbjay | G03B 15/00 |
| | | | 352/243 |
| 2005/0275831 A1* | 12/2005 | Silver | 356/237.1 |
| 2007/0171300 A1* | 7/2007 | Lai | H04N 5/232 |
| | | | 348/373 |
| 2007/0226088 A1* | 9/2007 | Miles | G06Q 10/08 |
| | | | 705/28 |
| 2007/0258092 A1* | 11/2007 | Finarov | 356/369 |
| 2008/0249859 A1* | 10/2008 | Angell | G06Q 30/02 |
| | | | 705/14.39 |
| 2011/0063611 A1 | 3/2011 | Chyba et al. | |

FOREIGN PATENT DOCUMENTS

| | | |
|---|---|---|
| JP | 2002-232768 | 8/2002 |
| JP | 2006-323012 | 11/2006 |

OTHER PUBLICATIONS

Partial Translation of Japanese Office Action mailed Apr. 5, 2016.
Japanese Office Action mailed Apr. 5, 2016.

* cited by examiner

AUTOMATED OPTICAL DIMENSIONING AND IMAGING

BACKGROUND

With the emergence of electronic ecommerce, an abundance of various items are entering the electronic marketplace. Placement of an item in an electronic marketplace traditionally requires manual entry of various information associated with the item.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to imaging items in order to automatically generate media and/or data associated with an item. When items are received by a merchant, human intervention generally must take place requiring a person to fill out a profile of the item to be sold by the merchant. A detailed profile of an item requires manual entry of various details associated with the item that may be used in the sale of the item. Such information may be the item name, weight, dimensions, description, and/or other information associated with the item. Additionally, images and/or three-dimensional renderings of the item must be created. Three-dimensional renderings, for example, permit customers of electronic marketplaces the ability to inspect an item from multiple angles. Accordingly, it may be desirable to employ an automated process whereby various images, three-dimensional renderings, and item data are generated automatically. In the following discussion, a general description of the system and its components is provided, followed by a discussion of the operation of the same.

Figure 1:
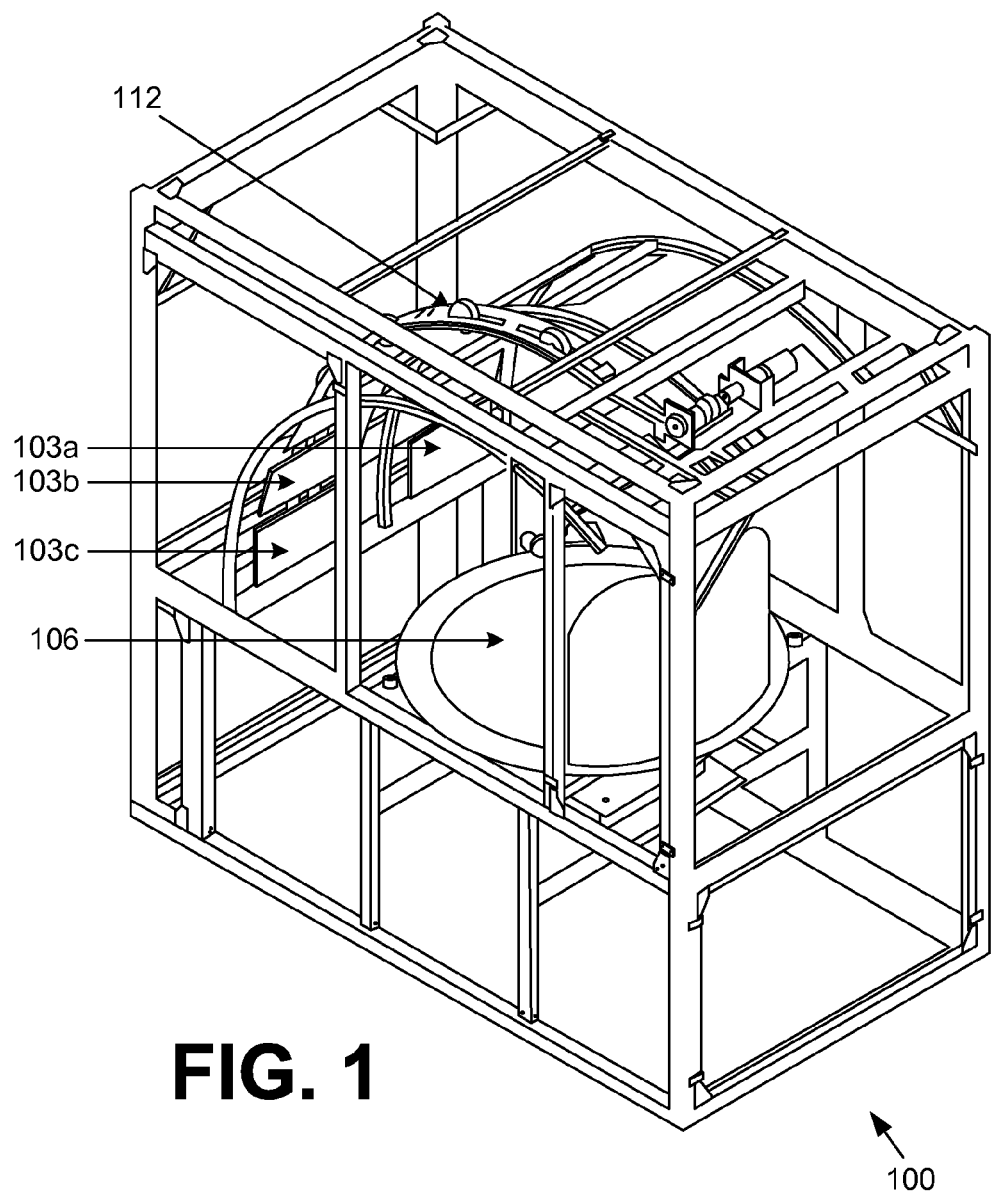
FIG. 1 is a drawing of an item imaging apparatus according to various embodiments of the present disclosure.

With reference to FIG. 1, shown is an example of an item imaging apparatus 100 according to various embodiments capable of capturing data and/or media associated with an item from various angles. In this non-limiting example, multiple lights 103a, 103b, and 103c, may be fixed to a curved light mount in order to provide varying angles of light to an item that may be supported by a platform 106 that is capable of rotation. An imaging device 109 (not shown), e.g., a camera, may be mounted and/or supported by a fixture set in a similarly curved track 112 or pathway in order to permit the movement of the device from one position to another in order to capture varying angles of media of the item positioned on the platform 106.

Next, a discussion of the computing environment is provided in which a user interface is generated followed by a discussion of the operation of the same.

Figure 2:
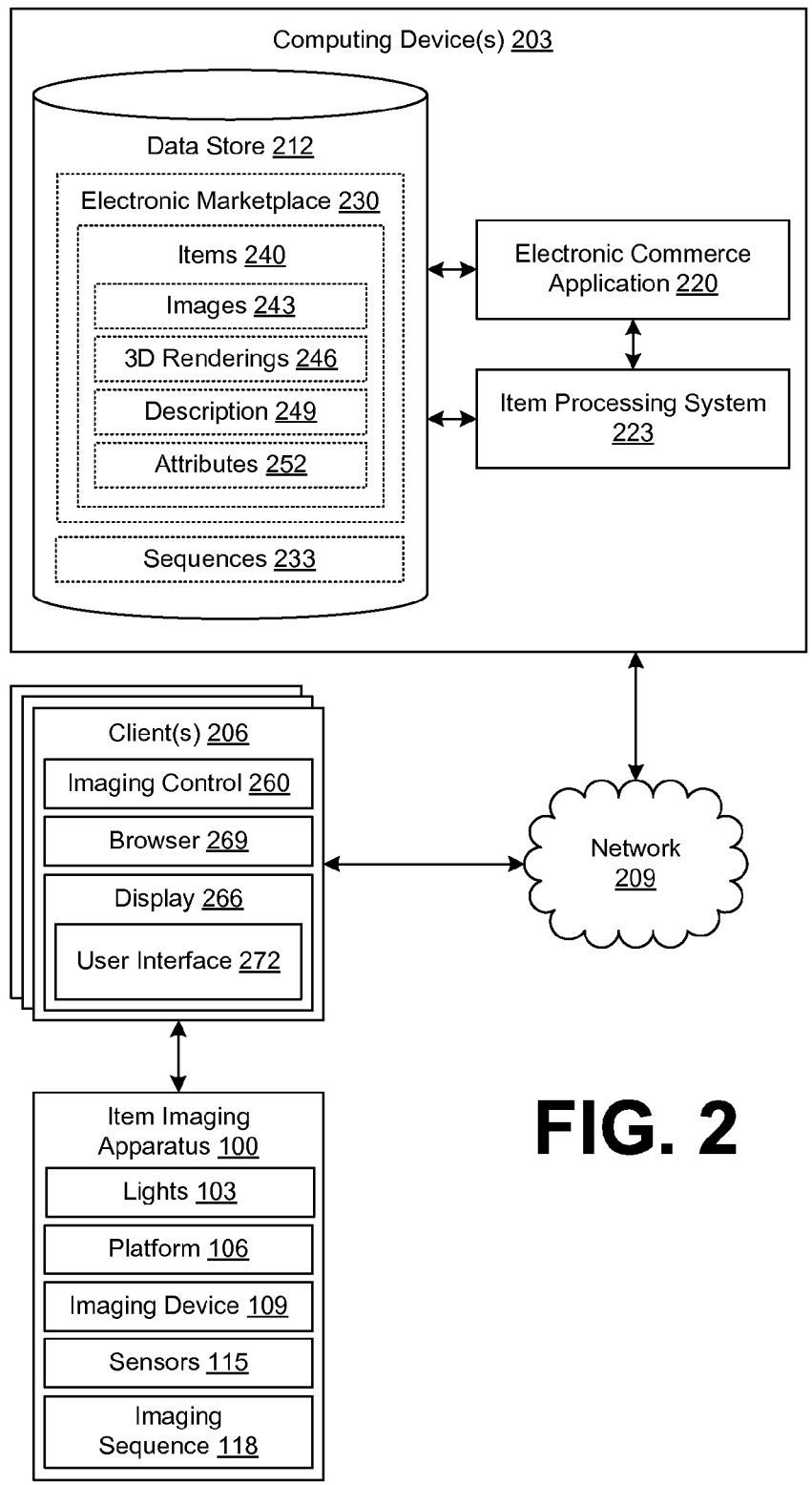
FIG. 2 is a drawing of a networked environment according to various embodiments of the present disclosure.

With reference to FIG. 2, shown is a networked environment 200 according to various embodiments. The networked environment 200 includes a computing device 203, a client device 206, and an item imaging apparatus 100, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing device 203 may comprise, for example, a server computer or any other system providing computing capability. Alternatively, the computing device 203 may employ a plurality of computing devices that may be employed that are arranged, for example, in one or more server banks or computer banks or other arrangements. Such computing devices may be located in a single installation or may be distributed among many different geographical locations. For example, the computing device 203 may include a plurality of computing devices that together may comprise a cloud computing resource, a grid computing resource, and/or any other distributed computing arrangement. In some cases, the computing device 203 may correspond to an elastic computing resource where the allotted capacity of processing, network, storage, or other computing-related resources may vary over time.

Various applications and/or other functionality may be executed in the computing device 203 according to various embodiments. Also, various data is stored in a data store 212 that is accessible to the computing device 203. The data store 212 may be representative of a plurality of data stores 212 as can be appreciated. The data stored in the data store 212, for example, is associated with the operation of the various applications and/or functional entities described below.

The components executed on the computing device 203, for example, include an electronic commerce application 220, an item processing system 223, and other applications, services, processes, systems, engines, or functionality not discussed in detail herein.

The electronic commerce application 220 is executed in order to facilitate the online purchase of items 240 in an electronic marketplace 230 over the network 209. The electronic commerce application 220 also performs various backend functions associated with the online presence of a merchant in order to facilitate the online purchase of items 240 as will be described. For example, the electronic commerce application 220 generates network pages such as web pages or other types of network content that are provided to clients 206 for the purposes of selecting items for purchase, rental, download, lease, or other form of consumption as will be described.

The item processing system 223 is executed to receive and/or access data and/or images 243 from the item imaging apparatus 100 and/or from the imaging control application 260. The item processing system 223 may perform various analyses on the data and/or images 243 in order to generate additional data associated with an item 240. The item processing system 223 may then store the data, images, three-dimensional renderings 246, three-dimensional wireframes, and/or any other information in association with the item 240 in a data store 212. Additionally, the item processing system 223 may determine and/or apply imaging sequences 118 to an imaging of an item 240 by the item imaging apparatus 100. An imaging sequence 118 comprises an orchestrated set of actions conducted in the item imaging apparatus 100 in order to successfully capture media and/or data corresponding to an item 240. The actions may include, for example, controlling the luminous intensity of the lights 103; the rotation of the platform 106; a reading of the sensors 115; the movement of an actuator, the capture process of an imaging device 109, and/or potentially other actions, all at various stages of an imaging process. The imaging sequence 118 may further control various features associated with one or more imaging devices 109 such as an adjustment of a tilt angle of an imaging device, a shutter speed, a zoom level, a lens aperture, one or more International Standards Organization (ISO) settings that adjust a sensitivity to light, and/or any other feature associated with the one or more imaging devices 109.

An imaging sequence 118 applied by the item imaging apparatus 100 in creating the data and/or media associated with the item 240 may be compared to the resulting data and/or media. For example, if it was determined that the imaging sequence 118 produced high-quality images of the item 240, which, in turn, generated high-quality three-dimensional renderings 246 of the item, the imaging sequence 118 may be scored and/or stored in data store 212 to be used in the future. Similarly, if the imaging sequence 118 applied by the item imaging apparatus 100 produced low-quality images of the item 240, the item processing system 223 may determine a new sequence 233 to apply. Ultimately, the item processing system 223 may modify permissions associated with the item 240 in order to make the item 240 available to view and/or purchase in an electronic marketplace 230 via the electronic commerce application 220.

The data stored in the data store 212 includes, for example, data associated with an electronic marketplace 230, sequences 233, and potentially other data. Data associated with the electronic marketplace 230 may include information related to a plurality of items 240 offered in the electronic marketplace. An item 240 may refer to a product, good, or any combination, bundle, or package thereof, that may be offered for sale, purchase, rental, lease, download, and/or any other form of consumption as can be appreciated. Item images 243, generated three-dimensional renderings 246, and/or an item description 249 may be stored in association with an item 240. Similarly, various item attributes 252 may be stored in association with an item 240. Such attributes may include, for example, titles, descriptions, quantities, conditions, images, options, weights, customer reviews, customer ratings, keywords, shipping restrictions, prices, tax classifications, unique identifiers, and/or any other data related to the items.

Imaging sequences 233 may be stored in data store 212 in order for the item processing system 223 to convey imaging sequences 233 to the imaging control application 260 executed on a client 206. Imaging sequences 233 may contain instructions on how to image and/or collect data associated with an item 240 via item imaging apparatus 100. Additionally, imaging sequences 233 may be stored in association with a category of an item 240.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application and/or other applications. The client application may be executed in a client 206, for example, to access network content served up by the computing device(s) 203 and/or other servers, thereby rendering a user interface 272 on the display 266. The client application may, for example, correspond to a browser, a mobile application, etc., and the user interface 272 may correspond to a network page, a mobile application screen, etc. The client 206 may be configured to execute applications beyond the client application such as, for example, an imaging control application 260, browsers, mobile applications, email applications, social networking applications, and/or other applications.

The imaging control application 260 is executed to receive an imaging sequence 118 from the item processing system 223 or determine an imaging sequence 118 independent of the item processing system 223. By applying an imaging sequence 118 to the item imaging apparatus 100, the imaging control application 260 may control the components of the item imaging apparatus 100 during an imaging process. For example, an imaging sequence 118 may be applied based at least in part on the nature of the item 240 being imaged. The imaging sequence 118 initiated by the imaging control application 260 may control the various components of the item imaging apparatus 100.

Next, a general description of the operation of the various components of the networked environment 200 is provided. To begin, it is understood that an impending imaging process exists in order to generate data and/or media describing an item 240. An imaging control application 260 executed on a client device 206 may determine an imaging sequence 118 to apply to an item 240. A certain imaging sequence 118 may be specific to a certain type of item 240 and/or a may be specific to a category associated with the item 240. For example, a particular imaging sequence 118 may be used if the item 240 is a box (e.g. a cereal box) as opposed to a different imaging sequence 118 that may be used if it were determined in box 903 that the item 240 is a jar (e.g. pasta sauce). Alternatively, the imaging control application 260 may request a sequence from the item processing system 223 which may in turn access a sequence 233 previously stored in data store 212. The imaging sequence 118 determined may be based at least in part on the type of item 240 being imaged. For example, a pre-scan may occur by the item imaging apparatus 100 in order to determine the type of item 240 being imaged. The pre-scan may include taking a still image of the item 240 in order to determine the type of the item 240 by performing various analyses on the image. For example, the item imaging apparatus 100 may direct the imaging device 109 to take an image of an optical identifier, e.g., a barcode. The imaging control application 260 or the item processing system 223 may apply an optical character recognition to the optical identifier in order to determine a category associated with the item 240 and/or a type of item 240. Alternatively, optical recognition of an image of an item label may identify a description of the item 240 which may be used in determining the type of the item 240.

Upon determination of an imaging sequence 118, the imaging sequence 118 may subsequently control an imaging process of the item 240. For example, the imaging sequence 118 may control the components of the item imaging apparatus 100 in order to perform the imaging process. Alternatively, the imaging control application 260 may control the components of the item imaging apparatus 100. Control of the components may include controlling the luminous intensity of the lights 103; the rotation of the platform 106; a reading of the sensors 115 at various points of the capture process; and/or the movement, zoom levels, tilt, and/or the capture process of an imaging device 109.

The imaging process generates data and/or media corresponding to the item 240. The media may comprise, for example, images, audio, and/or video of the item 240. The data may comprise information obtained from the sensors 115 and/or data obtained from the media. Upon completion or during the imaging process, the data and/or media obtained via the item imaging apparatus 100 may be transmitted and/or communicated to the imaging control application 260 to be sent to the item processing system 223 over a network 209. In alternative embodiments, the item imaging apparatus 100 may include an imaging control application 260 independent of a client device 206 and/or may communicate directly with the item processing system 223 via the network 209.

Upon receipt and/or access of the data and/or media obtained during the imaging process, the item processing system 223 may perform various analyses on the data and/or media to determine information about the item 240. For example, optical recognition results may be used in determining a name, description, dimensions, weight, item type, category type, and/or any other information associated with the item 240. Similarly, optical recognition results may determine symbols located on the item 240. The symbols may be used in categorizing the item 240. For example, certain symbols may suggest that a food item is organic. The description 249 of the food item may be generated to include that the item 240 is organic. Other symbols may suggest, for example, sweeteners, regions of origin, hazardous material, hardware requirements, temperature rating, etc.

The item processing system 223 may apply post-processing on the media generated during an imaging sequence 118. For example, undesirable shadows, irregularities, and/or artifacts may be detected and/or removed from the media. The item processing system 223 may further determine static images that may be ideal in placing the item on a product page in an electronic commerce application 220. For example, a frontal image of the product may be taken as a "main" image of the product to be used in a product page.

The item processing system 223 may generate three-dimensional models and/or three-dimensional renderings 246 of the item 240. A three-dimensional model, discussed below with respect to FIG. 7, may be used in determining the dimensions of the item 240 associated with the length, width, and/or height of the item 240. Static images 243 taken during the imaging process and/or derived from the media may be selected based on a degree of usability of the image.

The resulting data generated by the item processing system 223 may be used in determining a quality of the imaging sequence 118 applied during the imaging process. For example, the item processing system 223 may analyze the images 243, the three-dimensional renderings 246, the item description 249, and/or the item attributes 252 to identify any existing irregularities and/or a degree of usability. A score indicating the degree of the usability may be assigned to the imaging sequence 118 and the imaging sequence 118 may be saved in data store 212 as a sequence 233 to be used in future imaging processes. For example, the next similar item 240 imaged by the item imaging apparatus 100 may select an imaging sequence 118 associated with a high quality based at least in part on the score.

Upon generation of the information associated with the item 240, the item processing system 223 may store the information in the data store 212 relative to an electronic marketplace 230. An electronic commerce application 220 may access the information associated with an item 240 to generate a user interface 272 in order to permit a user of the electronic commerce application 220 the ability to view and/or purchase the item 240 over the network 209.

Figure 3:
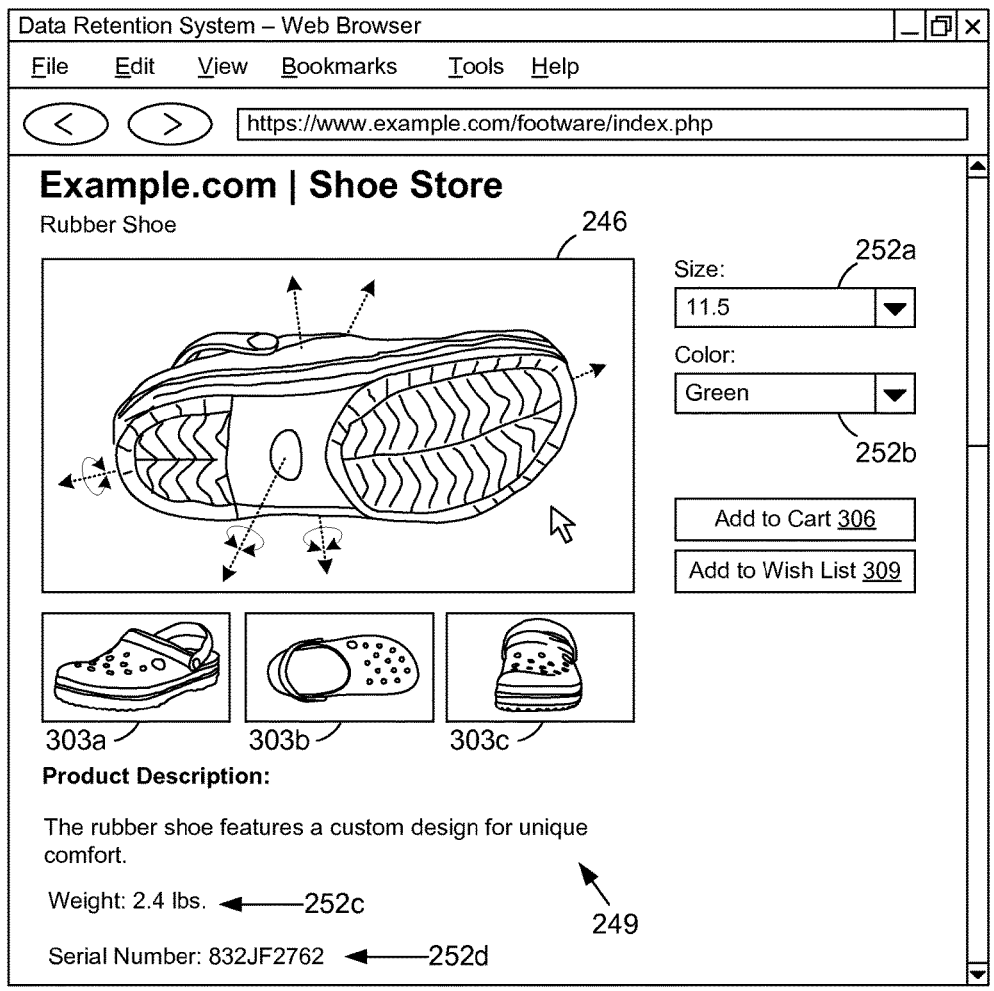
FIG. 3 is a drawing of an example of a user interface rendered by a client in the networked environment of FIG. 2 according to various embodiments of the present disclosure.

Referring next to FIG. 3, shown is an example of a user interface 272 in the browser 269 (FIG. 2) executed in the client 206 (FIG. 2) in the networked environment 200 (FIG. 2) according to various embodiments. Alternatively, the user interface 272 may be rendered on a client 206 by a dedicated application. Specifically, the user interface 272 depicts a network page generated by, for example, an electronic commerce application 220 (FIG. 2). In this non-limiting example, an item 240 (FIG. 2), i.e., a rubber shoe, is depicted as an item 240 available to view and/or purchase in an electronic marketplace 230 (FIG. 2).

As may be appreciated, the item 240 is visually represented by a three-dimensional rendering 246 of the item 240. Upon engagement of a dynamic three-dimensional rendering 246 of the item 240 by a user, the angle of the three-dimensional rendering 246 depicted in the network page may be dynamically altered by the user. For example, a user may control the angle of the three-dimensional rendering 246 in order to inspect all angles of the rubber shoe in a xyz plane by clicking and/or dragging on the image using a mouse cursor. Similarly, the user may be able to zoom in and/or out in order to inspect minor details of the item 240 or to view the entire item 240. Thumbnails 303a, 303b, and 303c, may be engaged by the user in order to change the angle presented by the three-dimensional rendering 246 to a predefined angle and/or to swap the three-dimensional rendering 246 with a static image.

Attributes 252a, 252b, 252c, and/or 252d associated with the item 240 may be shown in the user interface 272. Accordingly, attribute data 252 may be used in presenting options available for purchase in the electronic marketplace 230. For example, the size and/or color of a shoe may be offered to a user as attributes 252a and 252b. Similarly, the weight, dimensions, and/or item serial number may be shown to a user to present relevant information potentially helpful to a user during the purchase of an item 240. Additionally, a description 249 associated with the item 240 may be helpful to a user during the purchase of an item 240. An "Add to Cart" button 306 and an "Add to Wish List" button 309 may initiate the purchase or future purchase of an item 240 depicted in the user interface 272 of an electronic marketplace 230, as may be appreciated.

The attributes 252 and/or the description 249 shown in the user interface 272 may be dynamically generated as discussed in greater detail below. In the following discussion, a general description of compiling and/or generating the information and images via the system and its components is provided, followed by a discussion of the operation of the same.

Figure 4:
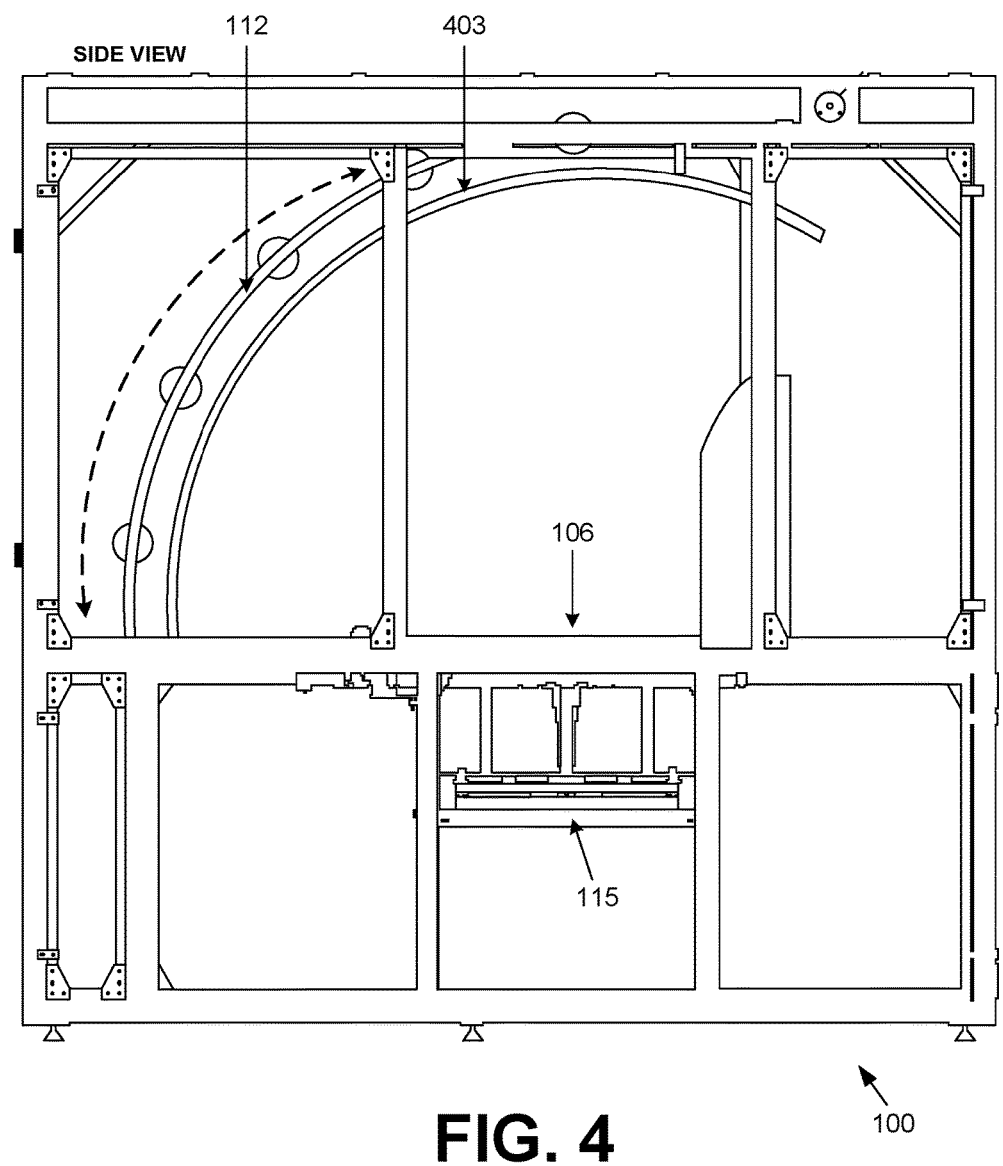
FIG. 4 is a drawing of the item imaging apparatus of FIG. 1 according to various embodiments of the present disclosure.

Turning now to FIG. 4, shown is a side view of an example item imaging apparatus 100 according to various embodiments. In this non-limiting example, a curved light mount 403 may be used to support lights and/or light panels in order to provide varying angles of light. An imaging device 109 (not shown), e.g., a camera, may be mounted and/or supported by a fixture fixated in a similarly curved track 112 or curved pathway in order to permit the movement of the device from one position to another in order to capture varying angles of images and/or video of the item 240 (FIG. 2) supported by the platform 106. An actuator or motor assembly (not shown), discussed below, may initiate and/or conduct the movement of the imaging device along the track or pathway.

Various sensors 115 may be used throughout the item imaging apparatus 100. For example, a sensor assembly 115 comprising a scale positioned below the platform 106 may measure, monitor and/or record the weight of the item supported by the platform 106. Similarly, the item imaging apparatus 100 may comprises sensors and/or sensor assemblies capable of measuring the luminous intensity of the lights at various locations, the position of the imaging devices on the curved track 112 or curved pathway, the tilt angle of the imaging device, the angle of rotation of the platform 106, and/or other sensors as may be appreciated.

Figure 5:
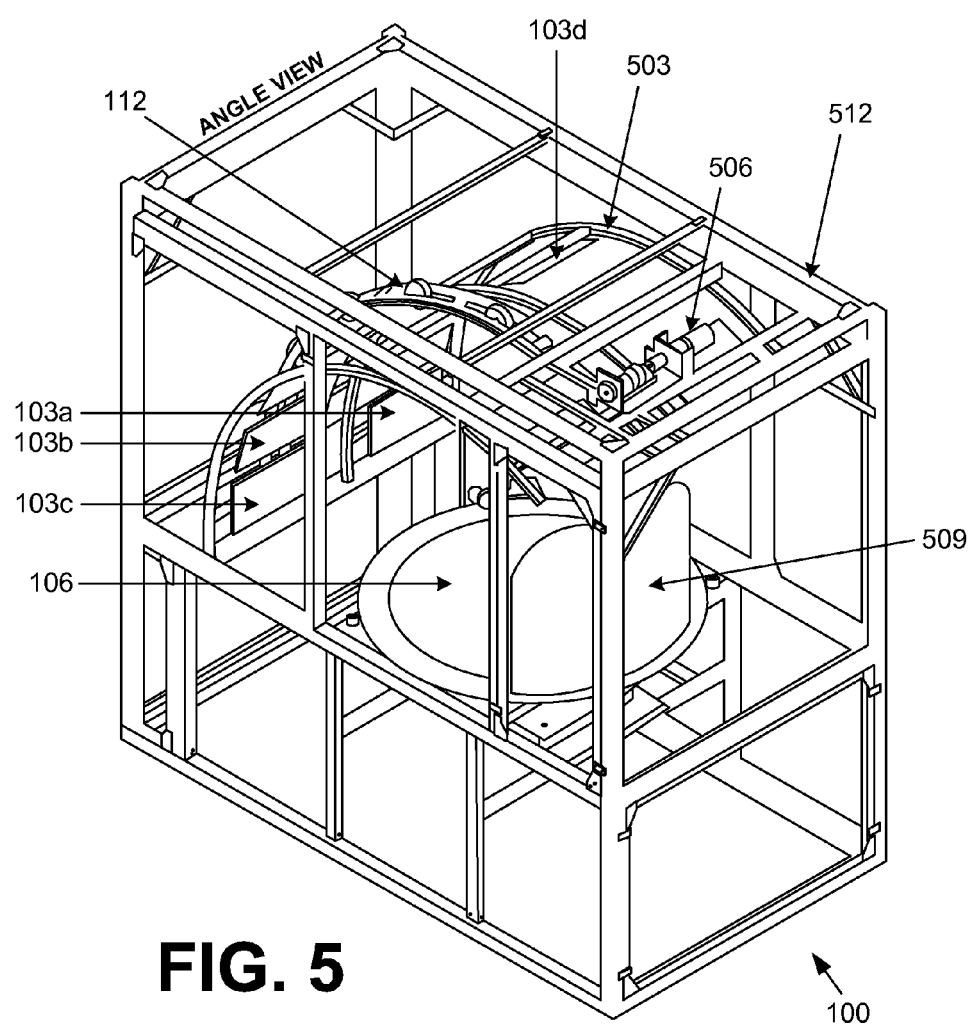
FIG. 5 is a drawing of the item imaging apparatus of FIG. 1 according to various embodiments of the present disclosure.

Moving on to FIG. 5, shown is an angular view of an example item imaging apparatus 100 according to various embodiments. In this non-limiting example, multiple lights 103*a*, 103*b*, and 103*c*, may be supported by a curved light mount 503 in order to provide varying angles of light to an item that may be supported by the platform 106. An imaging device 109 (not shown), e.g., a camera, may be mounted and/or supported by a fixture set in a similarly curved track 112 or curved pathway in order to permit the movement of the device from one position to another in order to capture varying angles of images of the item positioned on the platform 106. Alternatively, the imaging device 109 may be directly set on the curved track 112 or curved pathway. An actuator or motor assembly 506 may initiate and/or conduct the movement of the imaging device 109 along the curved track 112 or curved pathway from one position to another.

A reflector 509 may be connected to the platform 106 in order to provide a consistent lighting of the item 240 (FIG. 2) by the lights 103 as well as minimize any shadows. A frame 512 may support the components of the item imaging apparatus 100. For example, the platform 106, one or more curved mounts 503, and/or one or more curved tracks 112 or curved pathways, may be coupled to the frame 512 for support. The frame 512 may additionally encapsulate any wires used by the various components of the item imaging apparatus 100 such as those that may be necessary to power the device and/or communicate with one or more client devices 206. One or more backdrops, screens, and/or canvases (not shown) may be fixed on the interior and/or exterior of the frame 512. The color of the backdrop may reflect the color of a background of the media taken of the item. For example, a white backdrop encapsulating the frame 512 may produce an image of an item with a white background. Similarly, a green backdrop may encapsulate the frame 512 to produce an image of an item with a "green screen" background which may be ideal in applying a digital background to an image of an item.

Figure 6A:
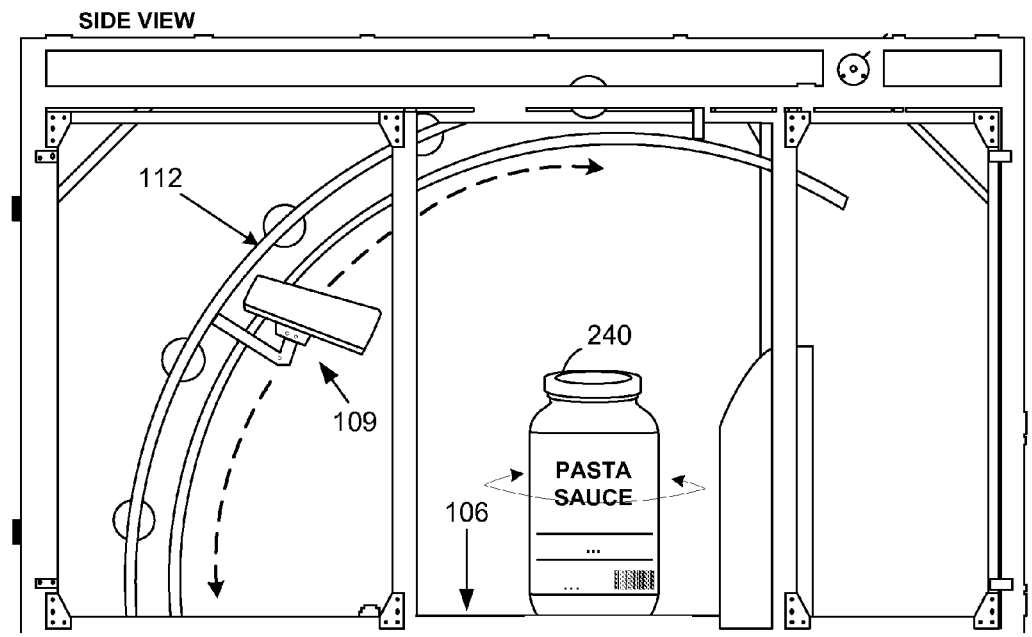
FIGS. 6A-B are drawings of the item imaging apparatus of FIG. 1 imaging an item according to various embodiments of the present disclosure.
Figure 6B:
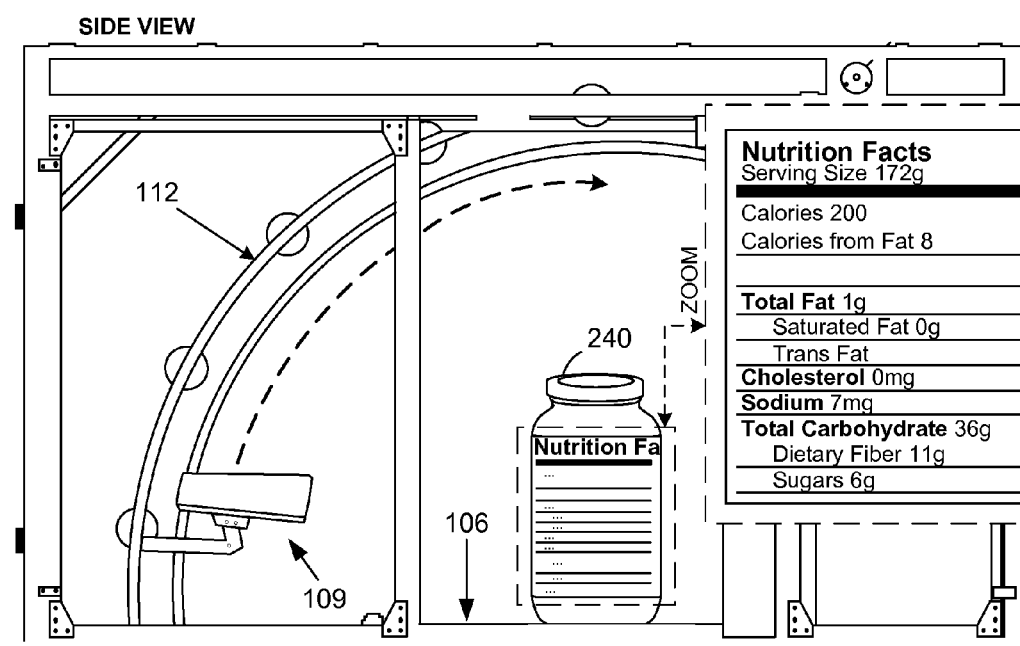

Referring next to FIGS. 6A-B, shown are examples of an item 240 situated in the item imaging apparatus 100. As shown, the item 240, not drawn to scale, may rotate while situated on the platform 106 permitting the imaging device 109 to capture media of all sides and angles of the item 240. The imaging device 109 may move from the bottom of the track 112, located at the bottom of item imaging apparatus 100, to the top of the track 112. At the top of the track 112, the imaging device 109 may capture an aerial view of the item 240. While at a lower position on the track 112, the imaging device 109 may capture still images of labels, icons, symbols, characters, and/or other characteristics that may appear on the item 240, its packaging, and/or its labels. In the non-limiting example of FIG. 6B, the imaging device 109 is located near the bottom of the track 112 in order to capture an image of a label of the item 240. The label contains, for example, nutritional facts which may be later used in generating data associated with the item 240.

Figure 7:
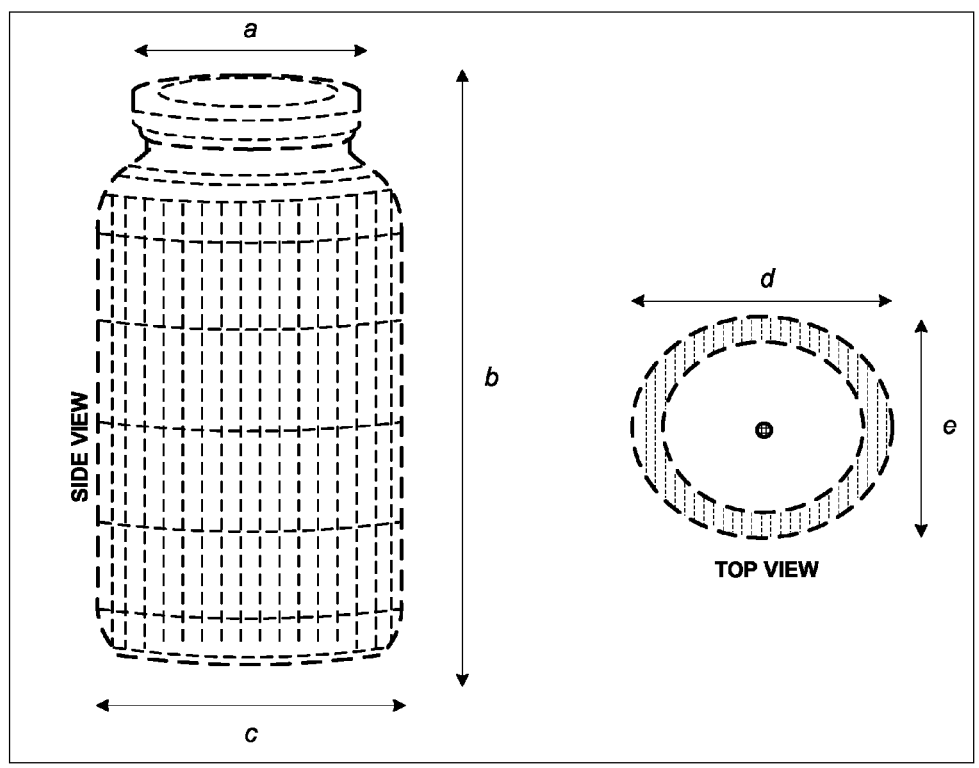
FIG. 7 is a drawing of a generated three-dimensional wireframe corresponding to the imaged item of FIGS. 6A-B.

Turning now to FIG. 7, shown is an example of a three-dimensional wireframe that may be generated by the item processing system 223 (FIG. 2). One or more three-dimensional wireframes may be used in the determination of various dimensions of an item 240. Dimensions may include, for example, the length, width, and/or height of the item 240 imaged by the item imaging apparatus 100 (FIG. 1). As may be appreciated, dimensions may be stored in association with an item 240 as an attribute 252 (FIG. 2). Similarly, the three-dimensional wireframes may be used in the generation of three-dimensional renderings 246 (FIG. 2) associated with the item that may be shown in a user interface 272 (FIG. 2). In the non-limiting example of FIG. 7, two wireframes associated with the item 240 of FIGS. 6A-B, may be generated by the item processing system 223.

Figure 8:
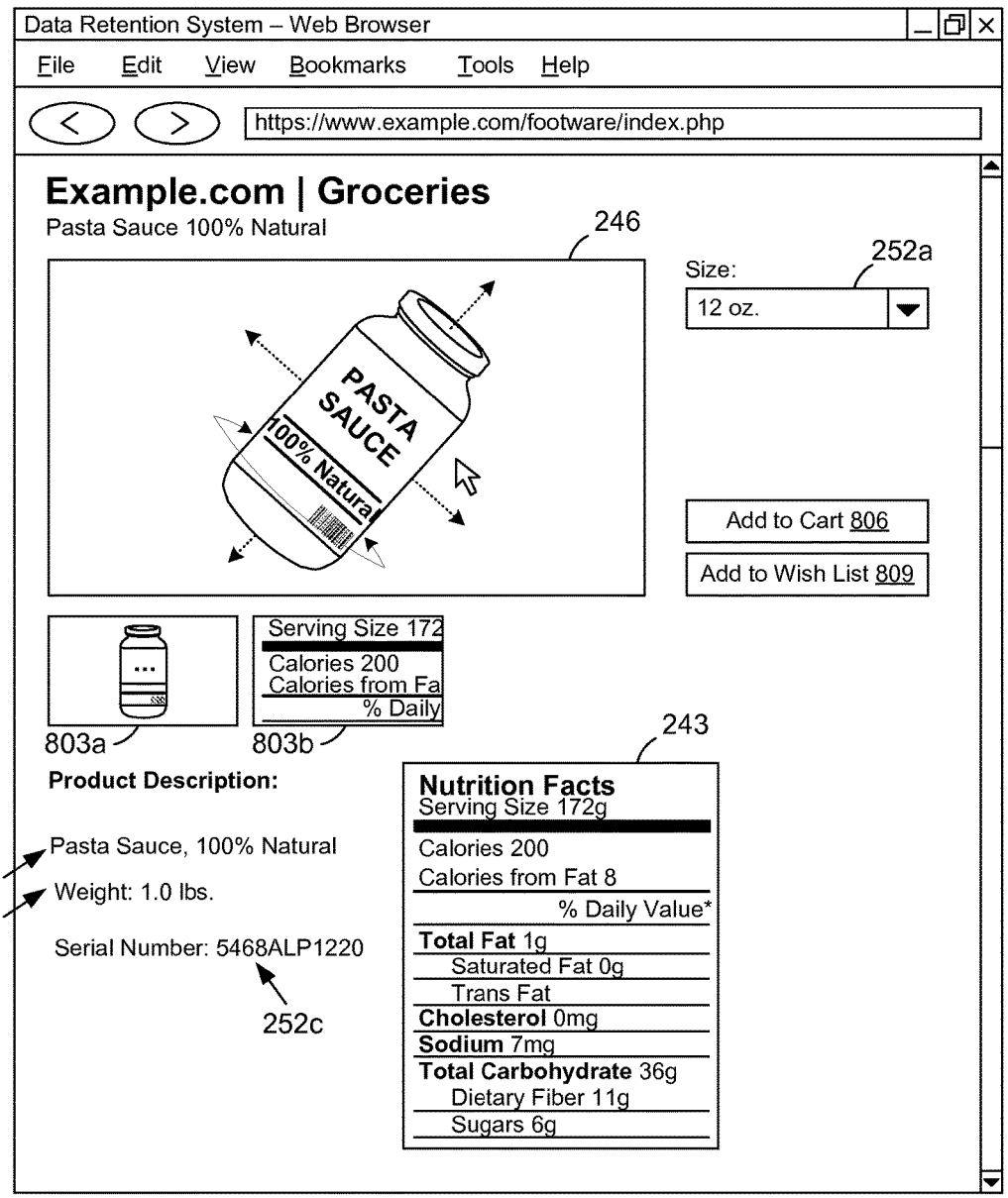
FIG. 8 is a drawing of an example of a user interface rendered by a client in the networked environment of FIG. 2 according to various embodiments of the present disclosure.

Moving on to FIG. 8, shown is shown is an example of a user interface 272 in the browser 269 (FIG. 2) executed in the client 206 (FIG. 2) in the networked environment 200 (FIG. 2) according to various embodiments. Alternatively, the user interface 272 may be rendered on a client 206 by a dedicated application. Specifically, the user interface 272 depicts a network page generated by, for example, an electronic commerce application 220 (FIG. 2). In this non-limiting example, an item 240, i.e., a jar of pasta sauce previously shown in FIGS. 6A-B and FIG. 7, is depicted as an item 240 available to view and/or purchase in an electronic marketplace 230 (FIG. 2).

The item 240 is visually represented by a three-dimensional rendering 246 of the item 240 generated by the item processing system 223 (FIG. 2). Upon engagement of a dynamic three-dimensional rendering 246 of the item 240 by a user, the angle of the three-dimensional rendering 246 depicted in the network page may be dynamically altered by the user. For example, a user may control the angle of the three-dimensional rendering 246 in order to inspect all angles of the jar in a xyz plane by clicking and/or dragging on the image using a mouse cursor. Similarly, the user may be able to zoom in and/or out in order to inspect minor details of the item 240 or to view the entire item 240. Thumbnails 803a and 803b may be engaged by the user in order to change the angle presented by the three-dimensional rendering 246 to a predefined angle and/or to swap the three-dimensional rendering 246 with a static image.

Attributes 252a, 252b, and/or 252c associated with the item 240 may be shown in the user interface 272. Accordingly, attribute data 252 may be used in presenting options available for purchase in the electronic marketplace 230. For example, the size of the jar of pasta sauce may be offered to a user as attribute 252a. Similarly, the weight, dimensions, and/or item serial number may be shown to a user to present relevant information potentially helpful to a user during the purchase of an item 240. Additionally, a description 249 associated with the item 240 may be helpful to a user during the purchase of an item 240. An "Add to Cart" button 806 and an "Add to Wish List" button 809 may initiate the purchase or future purchase of an item 240 depicted in the user interface 272 of an electronic marketplace 230, as may be appreciated. Additionally, images 243 of the item 240, the label of the item 240, and/or any other images of the item 240 may be shown in the user interface 272. In this non-limiting example, an image 243 from the label of the jar displaying the nutritional facts associated with the item 240 is shown in the user interface 272.

It is understood that optical character recognition may be applied to the label in order to extract the nutritional information from the jar, as may be appreciated. Additionally, it is understood that the attributes 252 and/or the description 249 shown in the user interface 272 may be dynamically generated from the data obtained from the item imaging apparatus 100 and/or the item processing system 223.

Figure 9:
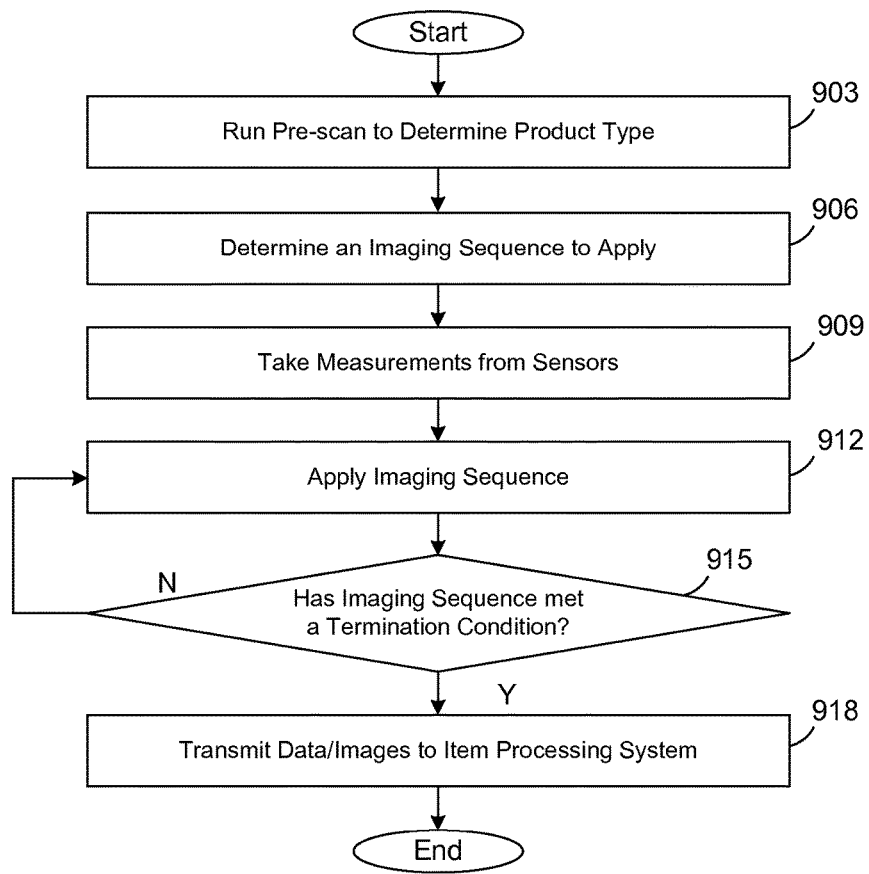
FIG. 9 is a flowchart illustrating one example of functionality implemented as portions of the imaging control application executed in a computing environment in the networked environment of FIG. 2 according to various embodiments of the present disclosure.

Referring next to FIG. 9, shown is a flowchart that provides one example of the operation of a portion of the imaging control application 260 according to various embodiments. It is understood that the flowchart of FIG. 9 provides merely an example of the many different types of functional arrangements that may be employed to implement the operation of the portion of the imaging control application 260 as described herein. As an alternative, the flowchart of FIG. 9 may be viewed as depicting an example of steps of a method implemented in the client device 206 (FIG. 2) according to one or more embodiments.

Beginning with box 903, an optional pre-scan of the item 240 (FIG. 2) may be conducted in order to determine a product type and/or a category associated with the item 240. The pre-scan may include taking a picture of the item 240 in order to determine the type of the item 240 by performing various analyses on the image. For example, the item imaging apparatus 100 (FIG. 2) may direct an imaging device 109 (FIG. 2) to take an image of an optical identifier, e.g., a barcode. By applying an optical character recognition, a category of the item 240 may be identified from the barcode.

Subsequently, in box 906, the type of the item 240 and/or a category associated with the item 240 identified in box 903 may be used in determining an imaging sequence 118 (FIG. 2) to apply. Accordingly, a certain imaging sequence 118 may be specific to a certain type of item 240 and/or specific to a category associated with the item 240. For example, a particular imaging sequence 118 may be used if the item 240 is a box (e.g. a cereal box) as opposed to a different imaging sequence 118 that may be used if it were determined in box 903 that the item 240 is a jar (e.g. pasta sauce). It is understood that if a type of the item 240 and/or a category associated with the item 240 were unable to be determined in box 903, a default imaging sequence 118 may be applied. Additionally, a type of the item and/or a category associated with the item 240 may be defined by a user.

In box 909, various sensors in the item imaging apparatus 100 may be read and/or measured during and/or after an imaging sequence 118. For example, the weight of the item 240 subject to the imaging sequence 118 may be measured. Additionally, sensors associated with the position of the image device 109 (FIG. 2), the luminous intensity of the lights 103 (FIG. 1), and/or any other sensors 115 (FIG. 2) used in the item imaging apparatus 100, may be measured. In box 912, the imaging sequence 118 is applied to control an imaging process of the item 240. For example, the imaging sequence 118 may control the components of the item imaging apparatus 100 in order to perform the imaging process. Control of the components may include controlling the luminous intensity of the lights 103; the rotation of the platform 106 (FIG. 1); a reading of the sensors 115 at various points of the capture process; the movement, zoom, tilt, and/or the capture process of an imaging device 109; and/or other potential components.

In box 915, is it determined whether a termination condition exists so that the imaging sequence 118 may be completed. For example, a termination condition may exist requiring all angles of an item 240 be captured by the imaging device. Alternatively, a termination condition may exist at a predefined period of time. In another embodiment, a termination condition may exist if a component of the item imaging apparatus 100 were to fail or become unresponsive. If a termination condition has failed to be met, the imaging sequence 118 in box 912 may continue uninterrupted and/or may restart. Alternatively, if a termination condition has been met, in box 918, the images and/or data obtained from the imaging sequence 118 may be stored in a data store 212 and/or transmitted to an item processing system 223 (FIG. 2).

Figure 10:
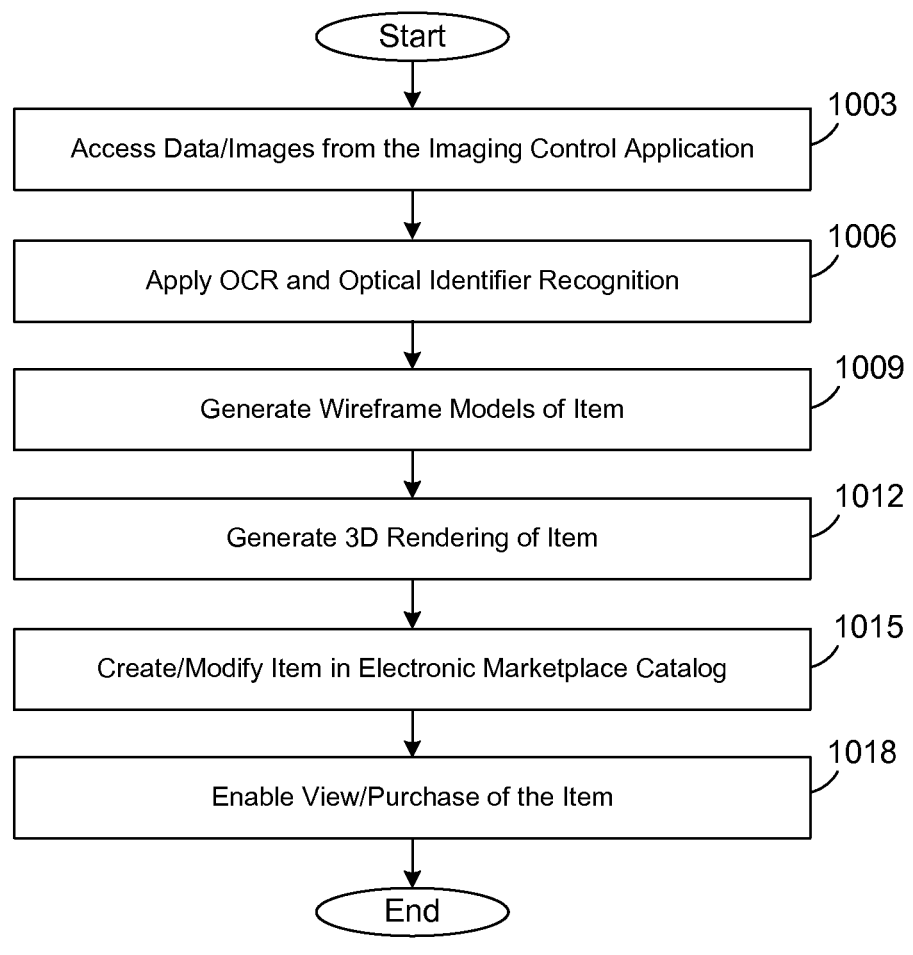
FIG. 10 is a flowchart illustrating one example of functionality implemented as portions of the item processing system executed in a computing environment in the networked environment of FIG. 2 according to various embodiments of the present disclosure.

Turning now to FIG. 10, shown is a flowchart that provides one example of the operation of a portion of the item processing system 223 according to various embodiments. It is understood that the flowchart of FIG. 10 provides merely an example of the many different types of functional arrangements that may be employed to implement the operation of the portion of the item processing system 223 as described herein. As an alternative, the flowchart of FIG. 10 may be viewed as depicting an example of steps of a method implemented in the computing device 203 (FIG. 2) according to one or more embodiments.

Beginning with box 1003, the images and/or data from the item imaging apparatus 100 (FIG. 1) and/or the imaging control application 260 (FIG. 2) may be accessed by the item processing system 223. In box 1006, optical recognition may be applied to the images to determine additional data that may have not been determined by the item imaging apparatus 100. For example, optical recognition may be applied to all or a select portion of the images in order to determine any identifiable characters, text, symbols, and/or graphics. The optical recognition results may be used in determining a name, description, dimensions, weight, item type, category type, and/or any other information associated with the item 240 (FIG. 2). For example, a label on an item 240 may state the weight of the item. The weight may accordingly be extracted from an image of the label. Similarly, the product name may appear in a larger typeset and the name of the item 240 may be extracted to be used as the name of the item 240 sold in the electronic marketplace 230 (FIG. 2). The data extracted from the images may be compared to extraneous data associated with the item 240 and/or may be compared to other data extracted from the images.

In box 1009, a wireframe model of the item 240 may be generated based on the images and/or data obtained from the image. The wireframe model may be used in generating additional images of the item 240, determining dimensions or other attributes 252 (FIG. 2) corresponding to the item 240, and/or may be used in determining the packaging of the item 240. In box 1012, a three-dimensional rendering 246 (FIG. 2) of the item 240 may be generated. The three-dimensional rendering 246 may permit a user to manipulate the rendering in order to view all details of the item 240 on a xyz plane. In box 1015, the data, three-dimensional renderings 246, and/or images associated with the item 240 may be made available on an electronic marketplace 230. For example, a product page corresponding to the item 240 may be generated and/or modified to include the three-dimensional rendering 246, a portion of the images, and/or the data generated from the item processing system 223. In box 1018, permissions associated with the product page may be modified to permit a user to view the product page and/or to purchase the item 240 corresponding to the product page.

Figure 11:
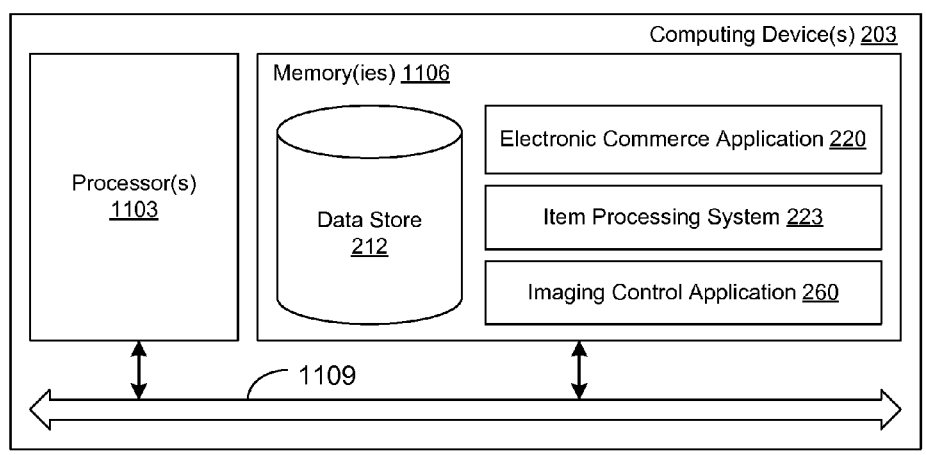
FIG. 11 is a schematic block diagram that provides one example illustration of a computing environment employed in the networked environment of FIG. 2 according to various embodiments of the present disclosure.

With reference to FIG. 11, shown is a schematic block diagram of the computing device 203 according to an embodiment of the present disclosure. The computing device 203 includes one or more computing devices 203. Each computing device 203 includes at least one processor circuit, for example, having a processor 1103 and a memory 1106, both of which are coupled to a local interface 1109. To this end, each computing device 203 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the electronic commerce application 220 (FIG. 2), the item processing system 223 (FIG. 2), the imaging control application 260 (FIG. 2), and potentially other applications. Also stored in the memory 1106 may be a data store 212 and other data. In addition, an operating system may be stored in the memory 1106 and executable by the processor 1103.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and/or multiple processor cores and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the electronic commerce application 220, the item processing system 223, the imaging control application 260, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 9 and 10 show the functionality and operation of an implementation of portions of the imaging control application 260 and the item processing system 223. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 9 and 10 show a specific order of execution, it is understood that the order of execution may differ from that which is depicted. For example, the order of execution of two or more blocks may be scrambled relative to the order shown. Also, two or more blocks shown in succession in FIGS. 9 and 10 may be executed concurrently or with partial concurrence. Further, in some embodiments, one or more of the blocks shown in FIGS. 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 220, the item processing system 223, and the imaging control application 260, that comprises software or code can be embodied in any non-transitory computer-readable medium for use by or in connection with an instruction execution system such as, for example, a processor 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device;
    an item imaging apparatus in communication with the at least one computing device configured to perform an imaging sequence where an item is imaged, the item imaging apparatus comprising:
        a rotatable platform configured to support and rotate the item;
        a scale assembly configured to measure a weight of the item;
        a plurality of lights configured to illuminate the item; and
        an imaging device capable of tilting and providing a plurality of zoom levels, wherein the imaging device is set on a curved pathway;
        an actuator configured to move the imaging device along the curved pathway from a first position to a second position; and
    program instructions executable in the at least one computing device that, when executed, cause the at least one computing device to perform a method comprising:
        performing a pre-scan where a still image of a machine-readable identifier is captured using the imaging device to identify a type of the item, the type of the item being determined using the machine-readable identifier;
        determining the imaging sequence to image the item from a plurality of potential imaging sequences stored in a data store based at least in part on the type of the item and a predetermined score indicating a degree of usability of the imaging sequence;
        causing an automated performance of the imaging sequence, wherein the imaging sequence comprises:
            varying a luminous intensity of the plurality of lights;
            causing the actuator to move the imaging device along a path of the curved pathway, wherein at least a portion of the path is above the item;
            rotating the rotatable platform; and
            conducting a capture process by the imaging device that captures a plurality of images of the item as the imaging device is moved along the curved pathway; and
        generating a three-dimensional rendering of the item based at least in part on the plurality of images.

2. The system of claim 1, wherein the method performed by the at least one computing device further comprises applying an optical character recognition to at least one of the plurality of images to identify the type of the item.

3. The system of claim 1, wherein the method performed by the at least one computing device further comprises programmatically modifying a permission associated with the item in response to the imaging sequence being performed to permit a product page for the item to become available that enables a purchase of the item through an electronic commerce system.

4. A system, comprising:
    at least one computing device; and
    an item imaging apparatus in communication with the at least one computing device, the item imaging apparatus comprising:
        a platform to support an item;
        a plurality of lights;
        at least one imaging device set on a pathway; and
        an actuator configured to move the at least one imaging device along the pathway from a first position to a second position; and
    program instructions executable in the at least one computing device that, when executed, cause the at least one computing device to perform a method comprising:

capturing a representative image of the item during a pre-scan operation;

identifying a type of the item based at least in part on the representative image;

identifying an imaging sequence to image the item from a plurality of potential imaging sequences based at least in part on the type of the item and a predetermined score indicating a degree of usability of the imaging sequence; and causing an automated performance of the imaging sequence using the at least one imaging device to generate a plurality of images of the item and data obtained from the plurality of images of the item.

5. The system of claim 4, wherein the item imaging apparatus further comprises a scale configured to measure a weight of the item.

6. The system of claim 4, wherein the imaging sequence comprises varying a luminous intensity of the plurality of lights.

7. The system of claim 4, wherein the imaging sequence comprises causing the actuator to move the at least one imaging device from the first position to the second position along the pathway.

8. The system of claim 7, wherein the imaging sequence comprises capturing the plurality of images of the item as the actuator moves the at least one imaging device from the first position to the second position.

9. The system of claim 7, wherein the imaging sequence comprises rotating the platform as the actuator moves the at least one imaging device from the first position to the second position.

10. The system of claim 7, wherein the imaging sequence comprises varying a zoom level of the at least one imaging device as the actuator moves the at least one imaging device from the first position to the second position.

11. The system of claim 4, wherein the pathway is curved.

12. A method, comprising:

determining, by at least one computing device, an imaging sequence to apply to generate a plurality of images of an item and to obtain data from the item, the imaging sequence determined based at least in part on a type of the item identified during a pre-scan operation and a predetermined score indicating a degree of usability of the imaging sequence;

causing, by the at least one computing device, an automated performance of the imaging sequence in an item imaging apparatus, the imaging sequence comprising:
selectively illuminating a plurality of lights;
moving at least one imaging device along a pathway; and
capturing the plurality of images with the at least one imaging device as the at least one imaging device is moved along the pathway;

generating, by the at least one computing device, a description of the item based at least in part on the data;

generating, by the at least one computing device, a three-dimensional rendering of the item based at least in part on the plurality of images; and generating, by the at least one computing device, user interface data comprising the description of the item and the three-dimensional rendering of the item.

13. The method of claim 12, further comprising programmatically modifying, by the at least one computing device, at least one permission associated with the item in response to the imaging sequence being completed to cause an item page for the item to become available to view in an electronic commerce system.

14. The method of claim 12, further comprising programmatically modifying, by the at least one computing device, at least one permission associated with the item in response to the imaging sequence being completed to cause an item page for the item to become available that facilitates a purchase of the item through an electronic commerce system.

15. The method of claim 12, further comprising generating, by the at least one computing device, a three-dimensional wireframe model of the item based at least in part on the plurality of images.

16. The method of claim 15, further comprising determining, by the at least one computing device, a plurality of dimensions associated with the item based at least in part on the three-dimensional wireframe model of the item.

17. The method of claim 12, further comprising applying, by the at least one computing device, an optical character recognition to at least one of the plurality of images to generate the data.

18. The method of claim 17, wherein the data comprises a plurality of characters associated with the item obtained from the optical character recognition.

19. The method of claim 12, wherein the data comprises at least one optical identifier associated with the item obtained from at least one of the plurality of images.

20. The method of claim 12, further comprising:
determining, by the at least one computing device, a score indicating a degree of usability of the three-dimensional rendering after the imaging sequence is performed; and
storing, by the at least one computing device, the score in association with the imaging sequence.

21. The method of claim 12, further comprising:
determining, by the at least one computing device, a score indicating a degree of usability of the description after the imaging sequence is performed; and
storing, by the at least one computing device, the score in association with the imaging sequence.

22. The system of claim 1, wherein the capture process is conducted by capturing the plurality of images of the item at a plurality of varying angles as the at least one imaging device is moved along the curved pathway.

23. The system of claim 3, wherein the electronic commerce system is configured to generate user interface data that includes the three-dimensional rendering of the item, wherein the user interface data comprises a user interface component that permits a manipulation of the three-dimensional rendering to dynamically alter a viewing angle of the three-dimensional rendering in a user interface.

24. The system of claim 1, wherein determining the imaging sequence to image the item from the plurality of potential imaging sequences further comprises applying a default imaging sequence in response to the type of the item not being identified.

25. The system of claim 3, wherein the electronic commerce system is configured to generate user interface data that includes a plurality of properties of the item obtained from the imaging sequence, wherein the plurality of properties comprise at least one of: the weight of the item, a name of the item obtained from at least one of the plurality of images, a description of the item obtained from at least one of the plurality of images, a dimension of the item, and the type of the item.

26. The system of claim 1, wherein the method performed by the at least one computing device further comprises post-processing at least one of the plurality of images of the item to detect and remove an artifact from the at least one of the plurality of images.

\* \* \* \* \*